United States Patent
Lee et al.

(10) Patent No.: US 9,208,148 B2
(45) Date of Patent: Dec. 8, 2015

(54) TRANSLATION SYSTEM AND METHOD

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Chung-I Lee, New Taipei (TW); De-Yi Xie, Shenzhen (CN); Hai-Yun Chen, Shenzhen (CN); Zhi-Qiang Yi, Shenzhen (CN)

(73) Assignees: Patentcloud Corporation, Shenzhen (CN); Patentcloud Co. Limited, Kwun Tong (HK)

( * ) Notice: Subject to any disclaimer, the term of this patent is extended or adjusted under 35 U.S.C. 154(b) by 300 days.

(21) Appl. No.: 14/014,467

(22) Filed: Aug. 30, 2013

(65) Prior Publication Data

US 2014/0172410 A1 Jun. 19, 2014

(30) Foreign Application Priority Data

Dec. 17, 2012 (CN) .......................... 2012 1 05481210

(51) Int. Cl.
*G06F 17/28* (2006.01)

(52) U.S. Cl.
CPC ................................. *G06F 17/2863* (2013.01)

(58) Field of Classification Search
CPC . G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
USPC ............................................................ 704/2–8
See application file for complete search history.

(56) References Cited

U.S. PATENT DOCUMENTS

| | | | | |
|---|---|---|---|---|
| 5,268,840 A * | 12/1993 | Chang | ..................... | G06F 3/018 704/9 |
| 6,374,210 B1 * | 4/2002 | Chu | ..................... | G06F 17/2863 704/9 |
| 7,191,177 B2 * | 3/2007 | Konaka | ............. | G06F 17/30616 707/758 |
| 8,655,639 B2 * | 2/2014 | Xu | .......................... | G06F 17/28 704/2 |
| 2005/0027513 A1 * | 2/2005 | Kanno | ................ | G06F 17/2735 704/10 |
| 2008/0288243 A1 * | 11/2008 | Kobayashi | .......... | G06F 17/2755 704/9 |
| 2010/0104188 A1 * | 4/2010 | Vetere | ................. | G06F 17/2755 382/177 |
| 2010/0161313 A1 * | 6/2010 | Karttunen | ........... | G06F 17/2775 704/9 |
| 2010/0309137 A1 * | 12/2010 | Lee | .......................... | G06F 3/018 345/171 |
| 2011/0238404 A1 * | 9/2011 | Xu | .......................... | G06F 17/28 704/2 |

* cited by examiner

*Primary Examiner* — Lamont Spooner
(74) *Attorney, Agent, or Firm* — Novak Druce Connolly Bove + Quigg LLP

(57) ABSTRACT

A computer obtains a word from a word list and searches for position codes corresponding to the obtained word in a file. The computer saves remaining position codes corresponding to the obtained word into the word list. The computer converts the file according to the position codes of each word in the word list between simplified Chinese and traditional Chinese, in response to a determination that all of the words in the word list have been obtained.

20 Claims, 5 Drawing Sheets

TRANSLATION SYSTEM AND METHOD

BACKGROUND

1. Technical Field

The embodiments of the present disclosure relate to management technology, and particularly to a translation system and method for languages.

2. Description of Related Art

At present, translation between the simplified Chinese and the traditional Chinese is to translate every character one by one. However, the translated words may be not correct after the translation. For example, the word "权利要求" in simplified Chinese is translated into the word "權利要求" in traditional Chinese, but the translated word "權利要求" are not correct in traditional Chinese. Thus, a user may have to take a lot of time to check the translated words after the translation and manually corrects translated words. For example, if the translated word is "權利要求" in traditional Chinese, the user may manually correct the translated word from "權利要求" to "申請專 利範圍" in traditional Chinese. Therefore, there is room for improvement in the art.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
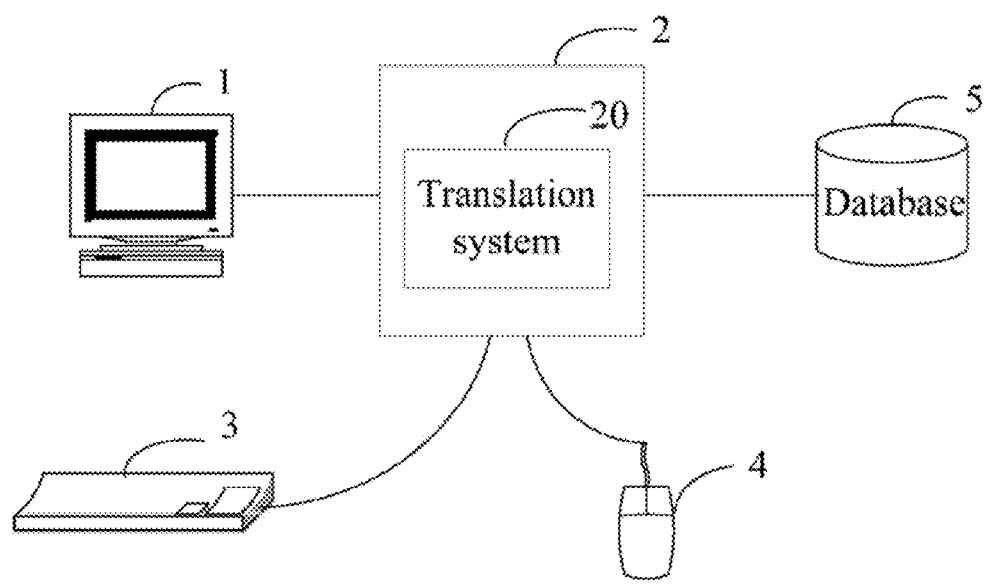
FIG. 1 is a block view of one embodiment of a computer including a translation system.

FIG. 1 is a block diagram of one embodiment of a computer 2. In this embodiment, the computer 2 includes a translation system 20, and the word "translation" can mean conversion or translation or an intermediate function. A plurality of peripherals are electronically connected to the computer 2, such as a display device 1, a keyboard 3, and a mouse 4. The peripherals may be used to input or output various computer signals or interfaces. The computer 2 electronically connects to a database 5 using open database connectivity (ODBC) or JAVA database connectivity (JDBC), for example. The database 5 may store a file or many files. The file may be written in simplified Chinese or in traditional Chinese. In one embodiment, the file is written in simplified Chinese as an example for the description given below. The translation system 20 translates the file from the simplified Chinese to the traditional Chinese. The file may be, but are not limited to, a WORD file, a PDF file, a TXT file, an extensible markup language (XML) file or a hypertext markup language (HTML) file.

Figure 4:
FIG. 4 illustrates a word list subjected to the method.

The database 5 stores a word list 600 as shown in FIG. 4. The word list 600 includes simplified Chinese words and traditional Chinese words. For better understanding of this invention, FIG. 4 also includes an explanation in English for each simplified Chinese word or each traditional Chinese word. For example, both the simplified Chinese word "权" and traditional Chinese word "權" mean "power" in English. Each simplified Chinese word may consist of one or more simplified Chinese characters, for example, the simplified Chinese word "权" consists of one simplified Chinese word "权" and the simplified Chinese word "数据" consists of the simplified Chinese word "数" and the simplified Chinese character "据." The traditional Chinese word may consist of one or more traditional Chinese characters. For example, the traditional Chinese word "數" consists of one traditional Chinese word "數" the traditional Chinese word "資料" consists of the traditional Chinese word "數" and the traditional Chinese character "料".

Furthermore, each simplified Chinese word corresponds to a traditional Chinese word in the word list 600. For example, as shown in FIG. 4, the simplified Chinese word "权" corresponds to the traditional Chinese word "權" the simplified Chinese word "权利要求" corresponds to the traditional Chinese word "申請專利範圍" the simplified Chinese word "数" corresponds to the traditional Chinese word "數" and the simplified Chinese word "数据" corresponds to the traditional Chinese word "數." For example, as shown in FIG. 5, the error word "权利要求" corresponds to the correct word "申請專利範圍", and the error word "數據庫" corresponds to the correct words "資料庫." The word list 600 is predetermined by a user, and the user can add/delete the simplified Chinese words and the traditional Chinese words to/from the word list 600.

Figure 5:
FIG. 5 illustrates the word list including position codes.

The word list 600 also includes position codes as shown in FIG. 5. In one embodiment, each identifier (e.g., a Chinese simplified character, a traditional Chinese character or an English letter) in the file corresponds to a position code. Each position code indicates a position of the identifier in the file. For example, as shown in FIG. 5, the position codes "1," "5," "22," and "55" indicate that the simplified Chinese word "权" is shown at four positions in the file. The position codes "67," "68," "69," "70," "75," "76," "77," "78," "86," "87," "88," and "89" indicate that the simplified Chinese word "权利要求" is shown at three positions in the file, which "权" in the "权利要求" corresponds to the position code "67," "75," "86," "利" in the "权利要求" corresponds to the position code "68," "76," "87," and "要" in the "权利要求" corresponds to the position code "69," "77," "88," and "求" in the "权利要求" corresponds to the position code "70," "78," "89." Additionally, when the simplified Chinese word includes two or more characters, the position code of the first simplified Chinese character in the simplified Chinese word represents the position code of the simplified Chinese word in the word list 600 as shown in FIG. 5. For example, as shown in FIG. 5, the simplified Chinese word "权利要求" includes four simplified Chinese characters, and the position codes "67," "75" and "86" of the first simplified Chinese character "权" in the simplified Chinese word represent the position codes of the simplified Chinese word in the word list 600.

Figure 2:
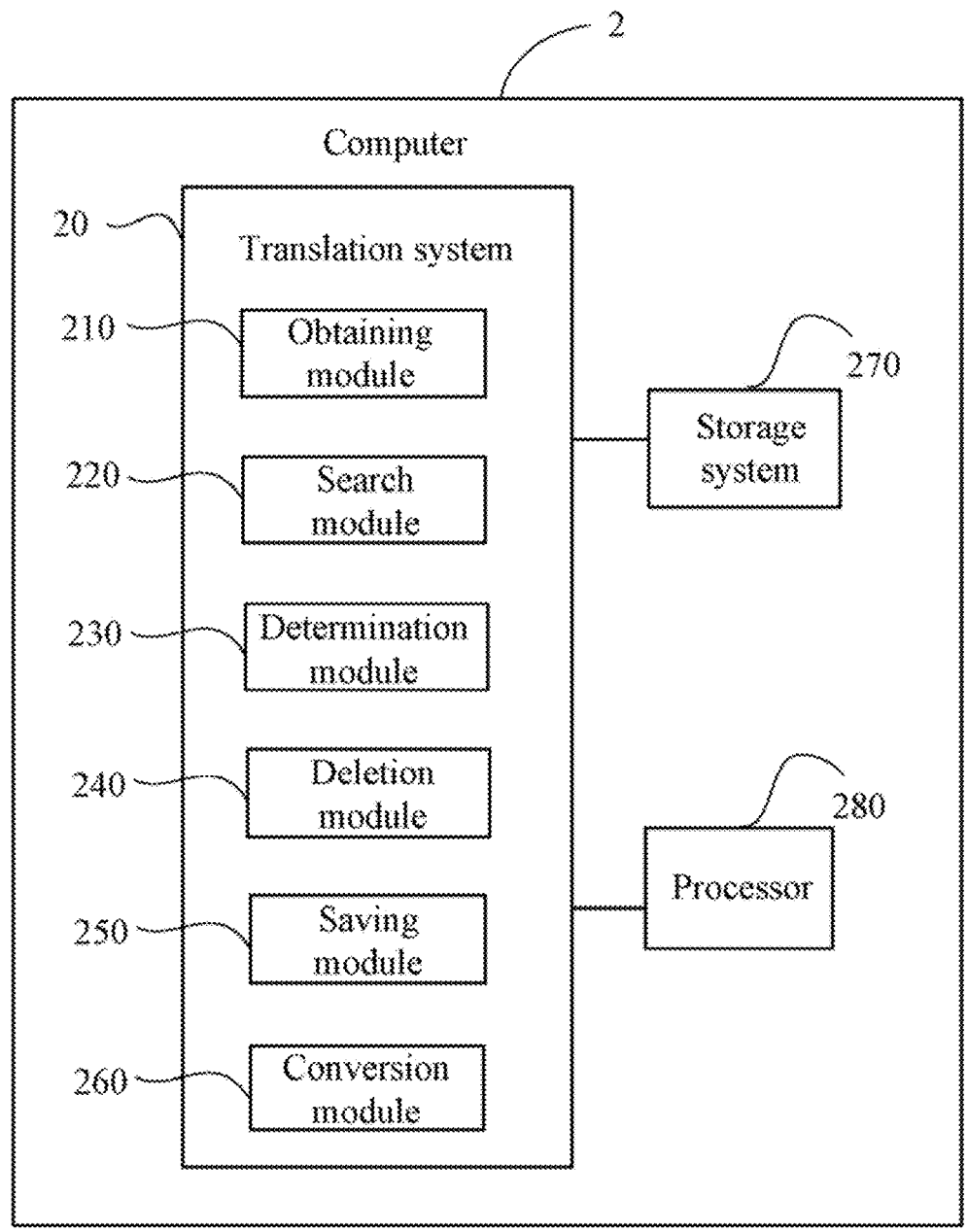
FIG. 2 is a block diagram of one embodiment of function modules of the translation system included in the computer in FIG. 1.

FIG. 2 is a block diagram of one embodiment of function modules of the translation system 20 included in the computer 2 of FIG. 1. The translation system 20 is used to translate the file between the simplified Chinese and the traditional Chinese. In one embodiment, the computer 2 includes a storage system 270 and at least one processor 280. In one embodiment, the translation system 20 includes an obtaining module 210, a search module 220, a determination module 230, a deletion module 240, a saving module 250, and a conversion module 260. The modules 210-260 may include computerized code in the form of one or more programs that are stored in the storage system 270. The computerized code includes instructions that are executed by the at least one processor 280 to provide functions for the modules 210-260. The storage system 270 may be a memory, such as an EPROM memory chip, hard disk drive (HDD), or flash memory stick.

The obtaining module 210 obtains a word from the word list 600. The word may be a simplified Chinese word or a traditional Chinese word. In one embodiment, the obtaining module 210 calculates a character length of each word in the word list 600, and obtains the word according to the character length of each word. The obtaining module 210 obtains the word in sequence from the longest character length of the word to the shortest character length of the word. The obtained word may be a simplified Chinese word or a traditional Chinese word in the word list 600. For example, as shown in FIG. 4, the obtaining module 210 first obtains the simplified word "权利要求." Additionally, if the character length of two or more words is the same, the obtaining module 210 randomly obtains the word one by one from the two or more words. For example, the character length of the simplified Chinese word "权" is the same as the character length of the simplified Chinese word "数," the obtaining module 210 randomly obtains the character length of the simplified Chinese word "数" or the simplified Chinese word "权."

The search module 220 searches for position codes corresponding to the obtained word in the file. In one embodiment, the file includes a search function for searching the position codes. For example, if the file is a WORD file, the search function is mAppNO.Index( ), the search module 220 invokes mAppNO.Index( ) to search for the position codes corresponding to the obtained word. The position codes corresponding to the obtained word indicates a position of the obtained word in the file.

The determination module 230 determines if the position codes corresponding to the obtained word overlaps with the position codes corresponding to other words, where the character length of each other word is longer than the character length of the obtained word. The overlapped position codes are included in the position codes corresponding to the obtained word and the position codes corresponding to other words. For example, the position codes corresponding to the simplified Chinese word "权" are searched as "1," "5," "22," "55," "67," and "75," and the position codes corresponding to the simplified Chinese word "权利要求" are "67," "68" "69" "70" "75," "76," "77," "78," "86," "87," "88," and "89," and the overlapped position codes are "67" and "75."

The deletion module 240 deletes the overlapped position codes from the position codes corresponding to the obtained word, in response to a determination that the position codes corresponding to the obtained word overlaps with the position codes corresponding to other words. For example, the deletion module 240 deletes the overlapped position codes "67" and "75" from the position codes corresponding to the simplified Chinese word "权."

The saving module 250 saves remaining position codes corresponding to the obtained word into the word list 600. For example, the remaining position codes to the simplified Chinese word "权" are "1," "5," "22," and "55."

The determination module 230 determines if all of the words in the word list 600 have been obtained.

The conversion module 260 converts the file between the simplified Chinese and the traditional Chinese according to the position codes of each word in the word list 600, in response to a determination that all of the words in the word list 600 have been obtained. In one embodiment, the conversion module 260 replaces each simplified Chinese word with the traditional Chinese word corresponding to the simplified Chinese word at the position codes corresponding to simplified Chinese word of the file. For example, the conversion module 260 replaces the simplified Chinese word "权" with the traditional Chinese word "權" at the position codes "1," "5," "22," and "55" of the file.

Figure 3:
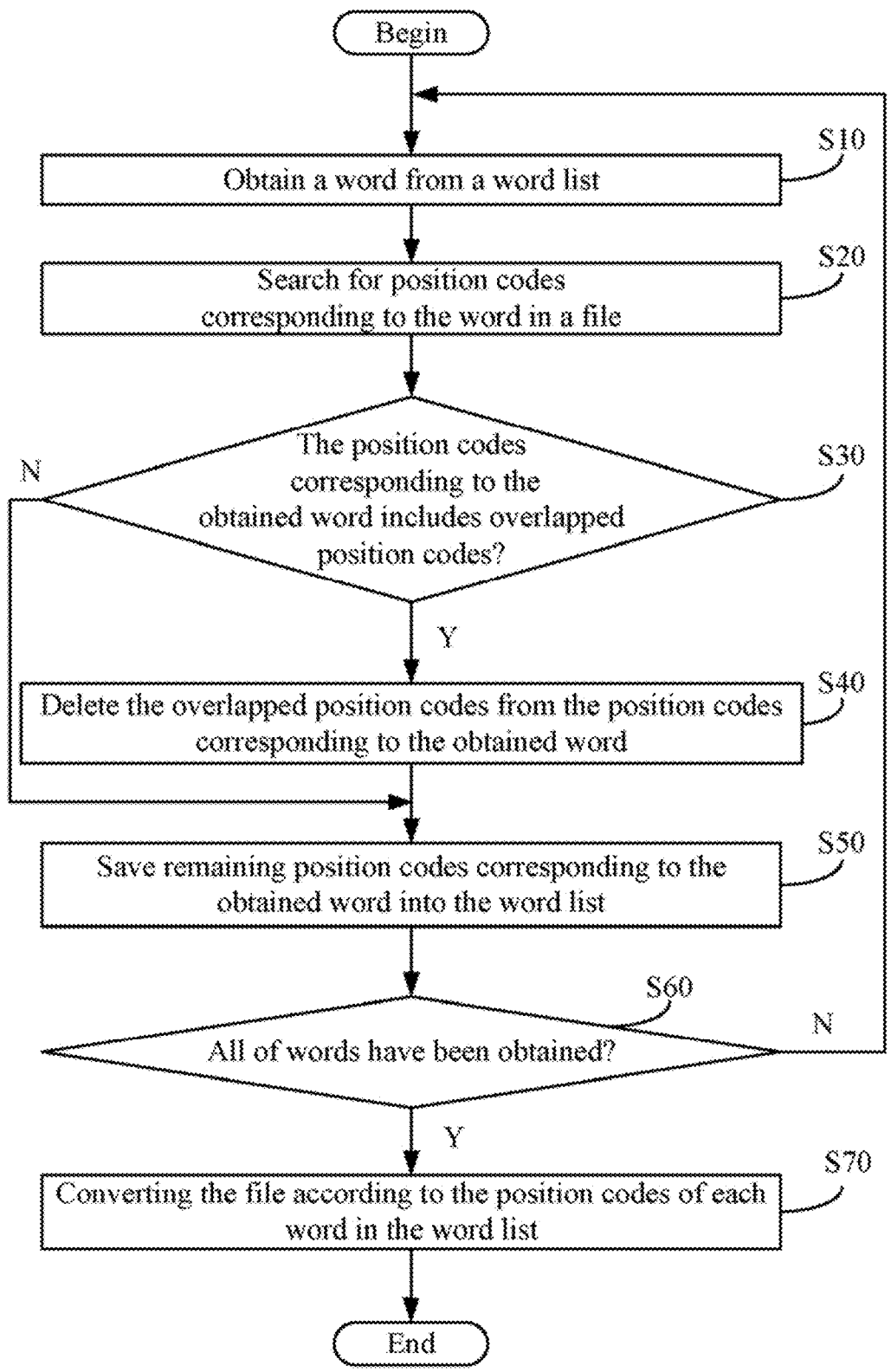
FIG. 3 is a flowchart of one embodiment of a translation method.

FIG. 3 is a flowchart of one embodiment of a translation method. Depending on the embodiment, additional steps may be added, others deleted, and the ordering of the steps may be changed.

In step S10, the obtaining module 210 obtains a word from a word list 600. As mentioned above, the obtained word may be a simplified Chinese word or a traditional Chinese word in the word list 600. In one embodiment, the obtained word is a simplified Chinese word in the word list 600 when the file is written in the simplified Chinese, and the obtained word is a traditional Chinese word in the word list 600 when the file is written in the traditional Chinese. For example, if the file is translated from the simplified Chinese to the traditional Chinese, the obtaining module 210 obtains the simplified Chinese word in the word list. In other words, the obtaining module 210 obtains the simplified word from the word list 600 when the file is written in the simplified Chinese.

In step S20, the search module 220 searches for position codes corresponding to the obtained word in the file. In one embodiment, if the file is a WORD file and written in simplified Chinese, the search module 220 invokes mAppNO.Index( ) to search for the position codes corresponding to the simplified Chinese word, such as "权."

In step S30, the determination module 230 determines if the position codes corresponding to the obtained word overlaps with the position codes corresponding to other words, where the character length of each other word is longer than the character length of the obtained word. As mentioned above, the overlapped position codes are included in the position codes corresponding to the obtained word and the position codes corresponding to other words. For example, the position codes corresponding to the simplified Chinese word "权" are searched as "1," "5," "22," "55," "67," and "75," and the position codes corresponding to the simplified Chinese word "权利要求" are "67," "68," "69," "70," "75," "76," "77," "78," "86," "87," "88," and "89," and the overlapped position codes are "67" and "75." If the position codes corresponding to the obtained word overlaps with the position codes corresponding to other words, the procedure goes to step S40. Otherwise, if the position codes corresponding to the obtained word do not overlap with the position codes corresponding to other words, the procedure goes to step S50.

In step S40, the deletion module 240 deletes the overlapped position codes from the position codes corresponding to the obtained word. For example, the deletion module 240 deletes the overlapped position codes "67" and "75" from the position codes corresponding to the simplified Chinese word "权."

In step S50, the saving module 250 saves remaining position codes corresponding to the obtained word into the word list 600. For example, the remaining position codes to the simplified Chinese word "权" are "1," "5," "22," and "55."

In step S60, the determination module 230 determines if all of the words in the word list 600 have been obtained. In one embodiment, the determination module 230 determines if all simplified Chinese words have been obtained from the word list 600. If all of the words in the word list 600 have been obtained, the procedure goes to step S70. Otherwise, if not all of the words in the word list 600 have not been obtained, the procedure returns to step S10.

In step S70, the conversion module 260 converts the file between the simplified Chinese and the traditional Chinese according to the position codes of each word in the word list 600. For example, the conversion module 260 replaces the simplified Chinese word "权" with the traditional Chinese word "權" at the position codes "1," "5," "22," and "55" of the file.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer, comprising:
   at least one processor; and
   a storage system that stores one or more programs, when executed by the at least one processor, cause the at least one processor to perform a translation method, the method comprising:
   obtaining a word from a word list stored in a database connected to the computer;
   searching for position codes corresponding to the obtained word in a file;
   determining if the position codes corresponding to the obtained word overlap with the position codes corresponding to other words, wherein a character length of each other word is longer than the character length of the obtained word;
   deleting overlapped position codes from the position codes corresponding to the obtained word, in response to a determination that the position codes corresponding to the obtained word overlaps with the position codes corresponding to other words;
   saving remaining position codes corresponding to the obtained word into the word list; and
   converting the file between simplified Chinese and traditional Chinese according to the position codes of each word in the word list, in response to a determination that all of the words in the word list have been obtained.

2. The computer of claim 1, wherein the word list comprises simplified Chinese words and traditional Chinese words, each simplified Chinese word corresponds to a traditional Chinese word in the word list.

3. The computer of claim 2, wherein the obtained word is a simplified Chinese word in the word list when the file is written in the simplified Chinese, and the obtained word is a traditional Chinese word in the word list when the file is written in the traditional Chinese.

4. The computer of claim 1, wherein the word in the word list is obtained according to the character length of each word.

5. The computer of claim 4, wherein all of the words are obtained in sequence from the longest character length of the word to the shortest character length of the word.

6. The computer of claim 1, wherein the position codes corresponding to the obtained word indicates a position of the obtained word in the file.

7. The computer of claim 1, wherein a search function of the file is invoked to search for the position codes corresponding to the obtained word.

8. The method of claim 1, wherein the position codes corresponding to the obtained word indicates a position of the obtained word in the file.

9. The method of claim 1, wherein a search function of the file is invoked to search for the position codes corresponding to the obtained word.

10. A translation method implemented by a computer, the method comprising:
    obtaining a word from a word list stored in a database connected to the computer;
    searching for position codes corresponding to the obtained word in a file;
    determining whether the position codes corresponding to the obtained word overlap with the position codes corresponding to other words, wherein a character length of each other word is longer than the character length of the obtained word;
    deleting overlapped position codes from the position codes corresponding to the obtained word, in response to a determination that the position codes corresponding to the obtained word overlaps with the position codes corresponding to other words;
    saving remaining position codes corresponding to the obtained word into the word list; and
    converting the file between simplified Chinese and traditional Chinese according to the position codes of each word in the word list, in response to a determination that all of the words in the word list have been obtained.

11. The method of claim 10, wherein the word list comprises simplified Chinese words and traditional Chinese words, each simplified Chinese word corresponds to a traditional Chinese word in the word list.

12. The method of claim 11, wherein the obtained word is a simplified Chinese word in the word list when the file is written in the simplified Chinese, and the obtained word is a traditional Chinese word in the word list when the file is written in the traditional Chinese.

13. The method of claim 10, wherein the word in the word list is obtained according to the character length of each word.

14. The method of claim 13, wherein all of the words are obtained in sequence from the longest character length of the word to the shortest character length of the word.

15. A non-transitory computer-readable medium having stored thereon instructions that, when executed by a computer, causing the computer to perform a translation method, the method comprising:
    obtaining a word from a word list stored in a database connected to the computer;
    searching for position codes corresponding to the obtained word in a file;
    determining whether the position codes corresponding to the obtained word overlap with the position codes corresponding to other words, wherein a character length of each other word is longer than the character length of the obtained word;
    deleting overlapped position codes from the position codes corresponding to the obtained word, in response to a determination that the position codes corresponding to the obtained word overlaps with the position codes corresponding to other words;

saving remaining position codes corresponding to the obtained word into the word list; and converting the file between simplified Chinese and traditional Chinese according to the position codes of each word in the word list, in response to a determination that all of the words in the word list have been obtained.

16. The non-transitory computer-readable medium of claim 15, wherein the word list comprises simplified Chinese words and traditional Chinese words, each simplified Chinese word corresponds to a traditional Chinese word in the word list.

17. The non-transitory computer-readable medium of claim 16, wherein the obtained word is a simplified Chinese word in the word list when the file is written in the simplified Chinese, and the obtained word is a traditional Chinese word in the word list when the file is written in the traditional Chinese.

18. The non-transitory computer-readable medium of claim 15, wherein the word in the word list is obtained according to the character length of each word.

19. The non-transitory computer-readable medium of claim 18, wherein all of the words are obtained in sequence from the longest character length of the word to the shortest character length of the word.

20. The non-transitory computer-readable medium of claim 15, wherein the position codes corresponding to the obtained word indicates a position of the obtained word in the file.

* * * * *